US012676868B2

(12) United States Patent
Sinks et al.

(10) Patent No.: US 12,676,868 B2
(45) Date of Patent: Jul. 7, 2026

(54) PATTERN ANALYSIS THREAT DETECTION ENGINE

(71) Applicant: Bank of America Corporation, Charlotte, NC (US)

(72) Inventors: Steven Sinks, Scottsdale, AZ (US); Jonathan Sheedy, Poynton (GB)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 18/219,920

(22) Filed: Jul. 10, 2023

(65) Prior Publication Data

US 2025/0023885 A1 Jan. 16, 2025

(51) Int. Cl.
*H04L 9/40* (2022.01)
*G06F 18/2415* (2023.01)

(52) U.S. Cl.
CPC ...... *H04L 63/1416* (2013.01); *G06F 18/2415* (2023.01)

(58) Field of Classification Search
CPC ............. H04L 63/1416; H04L 63/1425; G06F 18/2415
USPC ......................................................... 726/23
See application file for complete search history.

(56) References Cited

U.S. PATENT DOCUMENTS 6,327,550 B1 12/2001 Vinberg et al.
6,334,121 B1 * 12/2001 Primeaux .............. G06F 21/554
706/62

7,439,847 B2 10/2008 Pederson
7,555,146 B2 6/2009 Huang et al.
8,793,761 B2 7/2014 Chow et al.
9,009,089 B1 4/2015 El Defrawy et al.
9,166,993 B1 * 10/2015 Liu ..................... H04L 63/1425
9,516,053 B1 * 12/2016 Muddu ................ G06V 10/225
10,944,777 B2 3/2021 Lin et al.
11,201,882 B2 * 12/2021 Mirsky .................. H04L 67/12
11,586,972 B2 * 2/2023 Wang ................. G06F 16/2465
12,160,433 B1 * 12/2024 Krishnamoorthy ..... H04L 43/16
2016/0028762 A1 * 1/2016 Di Pietro ............ H04L 63/1416
726/23
2019/0205839 A1 * 7/2019 Dotan-Cohen ....... H04L 67/535
2019/0379682 A1 * 12/2019 Overby .................. H04L 12/40
2021/0075795 A1 * 3/2021 Liu ....................... H04L 63/107
2022/0012155 A1 * 1/2022 Xiao ..................... G06F 21/602
2022/0217156 A1 * 7/2022 Wahbo ................ H04L 63/1408
2024/0171979 A1 * 5/2024 Naili ................... H04W 12/121

(Continued)

*Primary Examiner* — Badri Narayanan Champakesan
(74) *Attorney, Agent, or Firm* — Banner & Witcoff, Ltd.

(57) ABSTRACT

A network system of pattern analysis includes a centralized AI-based pattern analysis engine and each computing device comprises a local AI-based pattern analysis engine. The pattern analysis engine(s) each analyze computing operations on a local machine basis or a on a network basis depending on where installed. The AI-based pattern analysis engines identify common activity patterns for each machine and exclude the common activity patterns from further analysis of the computing operations, leading to more efficient identification of activity patterns indicative of nefarious activity. Once detected, the AI-based pattern analysis engines trigger an incident response to counter the nefarious activities. The AI-based pattern analysis engines include AI models that are continually or periodically trained to update the baseline common activity patterns.

20 Claims, 4 Drawing Sheets

(56) References Cited

U.S. PATENT DOCUMENTS

| 2025/0023886 A1* | 1/2025 | Sinks | ................... | G06F 18/2148 |
| 2025/0077953 A1* | 3/2025 | Ezrielev | ................ | G06N 20/00 |

* cited by examiner

PATTERN ANALYSIS THREAT DETECTION ENGINE

BACKGROUND

Aspects of the disclosure relate to processes, machines, and platforms for information security and, in particular, to monitoring and scanning of software or data, to identify, using machine learning based and/or big data mining algorithms, attempted network intrusions by identifying normal operational patterns on computing devices throughout a computing network to isolate unusual activity on each computing device.

Enterprise computing systems (e.g., educational institution computing systems, corporate computing systems, financial institution computing systems, government computing systems and the like) may be constantly bombarded with data, both legitimate and illegitimate. In some cases, unauthorized individuals and/or threat actors may attempt to gain access into the enterprise computing system from any number of external sources, such as via email attachments, web browser provided links, and the like. A problem encountered with currently available malware and/or virus prevention applications often involves determining whether activity involving software, code snippets, links and the like are legitimate or not. With current technology solutions, threat control teams have difficulty in providing computing systems to prevent threat actors from bypassing network border controls attempting to obtain unauthorized access to the protected enterprise networks. Regardless of the tools implemented, threat mitigation controls tend to focus on closing or at least identifying a specific gap in the implemented security measures and then preventing those gaps from being misused.

In some cases, providers of network threat prevention software packages may open attachments up in virtual environments to determine whether the code in question is legitimate by determining how the code runs, performing heuristics against the code, and then, if it passes the checks, lets the code pass on into the computing environment of the enterprise computing network. In general, all checks performed by the malware and/or virus prevention applications are standard to all customers and cannot be customized based on parameters and/or network characteristics unique to individual customers. As such, threat actors may bypass such programs, in some cases, by simply coding in checks for publicly identifiable information tied to that particular enterprise (e.g., domain names) and/or coding checks to identify whether malicious code is being launched in a virtual or sandboxed environment and, if so, includes instructions to prevent the malicious code from running.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing a secure enterprise computing network. For example, aspects of the disclosure relate to cyber security for enterprise computing systems. One or more aspects of the disclosure relate to analysis of computing activity on each computing device in a computing network to identify activity patterns that indicate normal and expected activity upon each unique machine. A central pattern analysis server may aggregate the pattern analysis information across the enterprise network, as well as identifying normal activity patterns across the network. As such, the systems and methods discussed herein relate to first identifying normal activity patterns on both a machine-by-machine basis and from a network basis (e.g., multi-machine operational patterns) and second to identify operational.

A network system of pattern analysis includes a centralized AI-based pattern analysis engine and each computing device comprises a local AI-based pattern analysis engine. The pattern analysis engine(s) each analyze computing operations on a local machine basis or a on a network basis depending on where installed. The AI-based pattern analysis engines identify common activity patterns for each machine and exclude the common activity patterns from further analysis of the computing operations, leading to more efficient identification of activity patterns indicative of nefarious activity. Once detected, the AI-based pattern analysis engines trigger an incident response to counter the nefarious activities. The AI-based pattern analysis engines include AI models that are continually or periodically trained to update the baseline common activity patterns. This solution takes normal activity, abstracts it so that only anomalous activity is seen. It then allows the user to validate an anomalous activity, an AI to look to see if there are other similar patterns on a network that match and if so remove the user input from the equation to protect the environment and then require a system administrator to validate and action accordingly.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
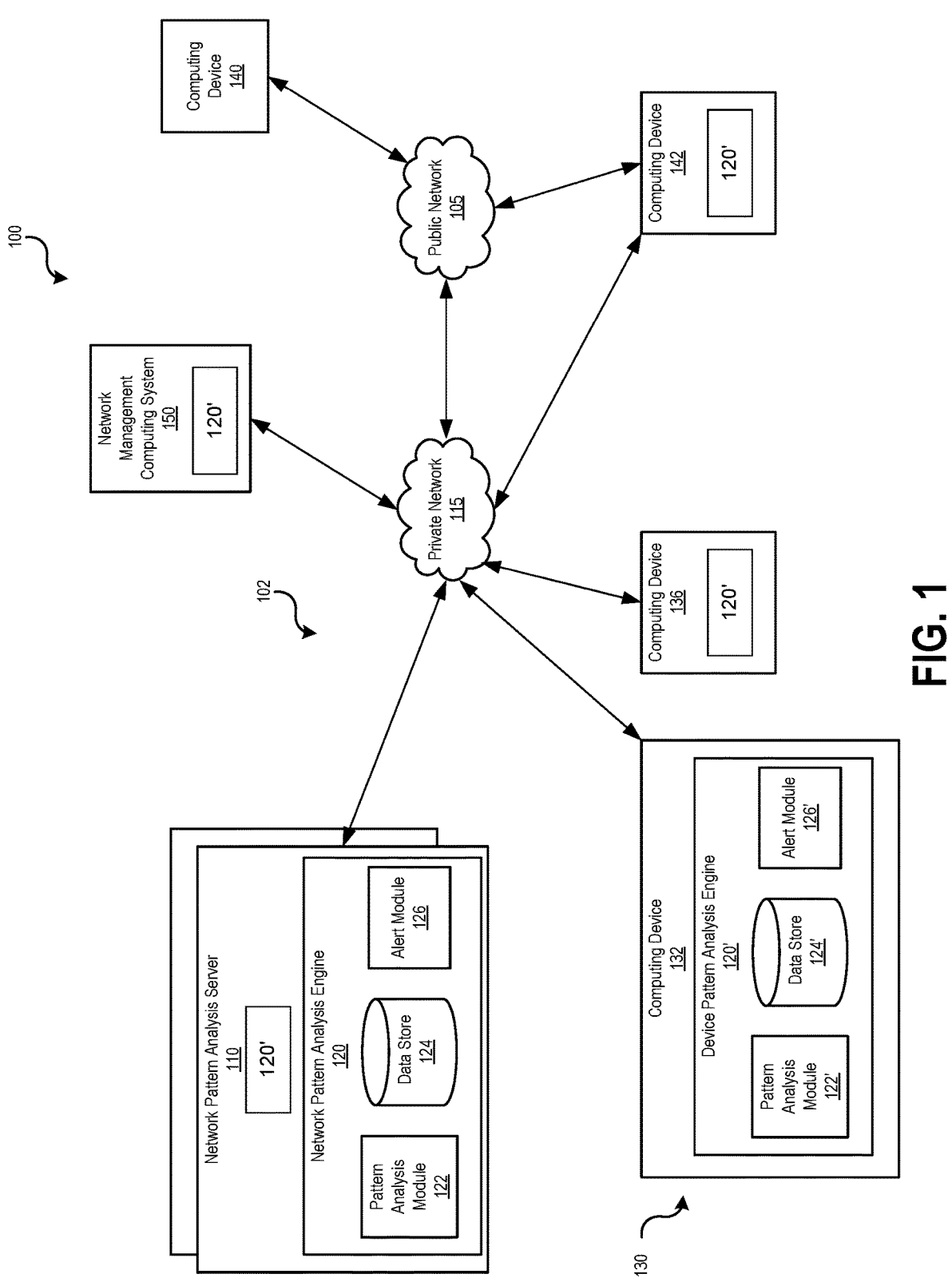
FIG. 1 shows an illustrative computing environment to secure a networked computing environment by identifying and filtering normal computing activity patterns within the computing environment in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Enterprise computer systems may be subject to a large number of data entry attacks, such as malware, computer viruses, worms, Trojan horses, ransomware, spyware, adware, scareware, phishing, fraud, and/or other potentially harmful schemes that may be either the same as or similar to data entry attacks being utilized by bad actors. In some cases, these data entry attacks may be initiated via executable code that may be accessed via a link or may be embedded in an attachment (e.g., documents, slide decks, spreadsheets, and the like). In some cases, the executable code may be benign and used to provide known and useful functionality that may be, for example, associated with a corresponding html page, document or other such file. However, in some cases, the executable code may be designed to perform some malicious activity to leverage a vulnerability of the enterprise network. In some cases, malicious code may be disguised as benign code and/or may be otherwise hidden so that when an application is launched, a webpage accessed, the malicious code may run in the background unnoticed until too late. In some cases, unauthorized individuals may attempt to bypass virus protection and/or malware prevention tools such as through use of environment variables. While some tools may analyze computing operational patterns in an attempt to match with previously identified attempts to run malicious computing code, no current tools identify baseline activity patterns on each machine within the computing network to isolate and identify anomalous behavior.

Enterprise computing systems are often complex, making recognition of legitimate network access difficult to determine what traffic should be let into the computing environment, and traffic that should be kept out. Aspects of this disclosure involve use of an artificial intelligence (AI) backend, along with pattern analysis, to determine what is unique to the day to day activities of each user on their individual computer machines. Additionally, the solution may also identify normal activity patterns for autonomous user accounts (e.g., bots) controlling operation of real and virtual machines within an enterprise network. Additionally, the systems and methods discussed herein may also perform pattern analysis on any updates done to a computing device (e.g., software, operating system, firmware, and the like), as well as pattern analysis on activities performed by system administrators, and other authorized users, may perform on any given computing device. These patterns may then be utilized to remove the 'noise' (e.g., any computing activity that would typically be just normal activity for each given machine) by a localized AI engine. This localized AI engine may then feed into a central database where a centralized AI engine would analyze patterns identified on various computing devices and attempt to match these patterns across the computing environment with network activity, again removing normal activity, to only provide alerting on anomalous activity.

At the local level or at the centralized level, if activity is identified, an alerting mechanism may notify one or both of an administrative console or web interface. At the same time, the alerting mechanism may provide alerting the end user about the anomalous activity associated with their user account or computing device via a third-party system such as text messaging (e.g., similar to the way that alerts are provided for transactions from an application computing system). Such alerting activity may be provided by same or similar mechanisms included in the enterprise network. As such, if the flagged anomalous activities are normal and expected activities, such as installing or testing new software or other coded operations, the user would be able to notify and inform the AI module, as well as the administrative console, that the flagged activity was normal, should be considered as a possible addition to the pattern normalization for their machine. Once confirmed, the system would then release or otherwise allow the action to occur. If, for example, a centralized AI pattern analysis server happened to identify the same (or similar) anomalous activity on different computing devices across the computing environment, the AI pattern analysis engine may then block the flagged activity with a requirement that an administrator to review and unblock as necessary.

A need has been recognized for an application to gather common institutional computing information (e.g., normal computing activity on each local machine, normal computing activities across two or more networked machines, and the like) about an enterprise computing environment that may be normal computing activities for a particular enterprise. Using this information, the application may use with an artificial intelligence (AI) engine and/or big data mining application to filter normal activity patterns from machine analysis, thus freeing computing resources (e.g., computing power, network throughput, and the like) to improve scanning times and identification of anomalous activity on each local computing device (both real and virtual), and across networked computing devices. For example, a combination of a network activity pattern analysis server and localized network activity pattern analysis engines operating on each computing device (e.g., laptop, workstation, server, and the like) and each instance of virtual computing machines, to information that is unique to each computing device and enterprise computing network to build a customized analysis platform to prevent malware from gaining unauthorized access to an enterprise computing network.

FIG. 1 shows an illustrative computing environment 100 to secure a networked enterprise computing environment 102 by identifying normal computing activity patterns on each local computing device (e.g., hardware computing device, virtualized computing device, and the like), filtering the normal computing activity patterns from scanned activities to efficiently identify anomalous and/or malicious computing activities in accordance with one or more aspects described herein. For example, the computing environment may include multiple computing devices communicatively coupled via one or more computing networks (e.g., public network 105, private network 115, and the like). For example, one or more computing devices (e.g., computing device 132 and computing device 136) of the enterprise computing network 102 may be communicatively coupled together via the private network 115 and to one or more computing devices external to the enterprise computing environment 102 (e.g., computing device 140). In some cases, a computing device 142 (e.g., a mobile computing device, a laptop, a mobile phone, and the like) may be capable of communicating via the private network 115 and/or the public network 105. The enterprise computing environment 102 may further include a network management computing system 150 that may include one or more computing devices used by a network administrator to perform management activities for the enterprise computing environment 102, where the management activities may include performing updates on each computing device on the network. The network management computing system 150 may further include computing systems for incident management to analyze and perform actions based on identified potential alerts generated by the network pattern analysis engine 120.

In some cases, the secure enterprise computing environment 102 may include a computing device (e.g., a network pattern analysis server 110) processing code to provide functionality of a network pattern analysis engine 120 to protect the enterprise computing environment from malicious attempts to gain access to sensitive information. An illustrative example of the network pattern analysis engine 120 may include a pattern analysis module 122, a data store 124, an alert module 126, and the like. Additionally, each computing device on the enterprise network, including, for example, computing device 132, 136, and 142, includes a device pattern analysis engine 120' that includes a local pattern analysis module 122', a data store 124', and an alert module 126' that may be used to identify patterns of activity on the associated local computing device and generate alerts when unknown or suspicions patterns of activity occur. Additionally, each computing device within the network management computing system 150 may also include a local pattern analysis engine 120' as described above. Each instance of the device pattern analysis engine 120' installed on a local machine may be in communication with a central network pattern analysis server 110 and the centralized pattern analysis engine 120. In some cases, the computing environment 102 may include multiple network pattern analysis servers 110, where the functionality may be regionalized to improve processing of information, due to the amount of data that may be generated over a large computing network. For example, for an international computing environment 102, a first network pattern analysis server 110 may operate for a first region (e.g., a North American region) and a second network pattern analysis server 110 may monitor a second region (e.g., a European region), where patterns may be synchronized between regions.

While working, users may perform actions on a computing device that involve one or more computing programs that read or write data over the computing network. Current efforts in endpoint detection of malware, antivirus, and malicious activity rely upon information tied to finding a known issues, known malicious activities and utilized vulnerabilities. Because costs tied to computing equipment, memory and the like has decreased over time, the amount of information managed and leveraged for endpoint and/or network security measures has gone up exponentially. For example, control teams have analyzed endpoint data perform antivirus protection processes based on signatures as to what is malicious or not based on what a user is doing. However, such processes do not have any information about any potential threats that have not already been identified. For these processes, the security tools use heuristics to identify what is a typical threat pattern. Due to the increased amount of data logged and monitored, this issue has now gotten worse because if the system is able to monitor computing activities and analyze each data log on a machine and/or across the network, the amount of computing power and/or time to do this analysis has risen exponentially because information about most every action being performed on a machine may be stored in a data log. In many cases, false alerts may be generated due to infrequent, but normal, operations performed on a machine may be flagged as potential threats. For example, an action may initially appear to be nefarious when viewed from a user device perspective. But, when, associated with activities normally performed by via a system administrator account (e.g., new patches to software, installation, deactivation, or removal of hardware, disablement of drivers, temporary disablement of antivirus or malware monitoring software, editing of registry keys, movement of data, and/or the like), the actions are not only benign, but a necessary part of their role in the organization. As such, a problem with current approaches to network security is that not every infrequent operation being performed on a machine, as they may fall into a normal activity pattern, when considered in context of the administration of the network as a whole. Indeed, advanced threat actors may intentionally perform subtle operations in ways that appear normal, and to further that goal, may monitor day to day activities on a machine once they obtain access and then try to match the monitored activity as much as possible.

As such, a need has been recognized to monitor operations and computing activities across a network, via an artificial intelligence (AI)-based solution to build and train a model capable of filtering normal activity patterns on a machine-by-machine basis, a site basis, a region basis, and the like, for each user account (human associated accounts, service accounts, automated bot accounts, and the like), and over time of day, week, month or year. Recognizing that each user, based on their role in the organization, personal preferences, access rights, regional regulations, business rules, and the like, will perform their work (even if the activities are the same or similar to activities being performed by others) a little differently. In other words, each activity performed by different individuals or service accounts across the network, will perform their day-to-day activities in their own unique pattern. While these activities may have the same or similar results, the patterns will be unique. For example, two users having similar roles (e.g., software developers, accounting professionals, and the like) may perform similar tasks using same or similar software that produce the same or similar results, but the patterns will be unique. Similarly, each network administrator, when they log into a particular device, will have a unique pattern in performance of their activities. In general, an activity pattern may provide a baseline snapshot to how each user works, the type(s) of data accessed, type(s) of programs used, time(s) of day for normal activities, and the like. In short, each user has an activity pattern that reflects their preferences in how and when they work.

Once generated, these baseline activity patterns may be found for particular time periods (e.g., daily or 24 hours, 12 hours, "normal" work hours for the individual, weekly, monthly, and the like). These baseline patterns may now be considered by the AI activity model as "white noise" and filtered from the activities being monitored. Any variation from the norm may be flagged for additional analysis. By removing the normal activities from analysis, the scanning of the remaining activities on the computing device can be performed in less time and using less computing power. Understanding that computing processes and technology evolve over time, such that activity patterns may change as well. The AI analysis engine can be configured to continually train a pattern activity model to ensure that the normal activity patterns for users remain up to date. This may be done through automatically provided and manually entered feedback from network security analysis applications, team members and users. For example, an updated process due to a program update may cause the activity pattern to change outside a threshold amount of activity (e.g., an additional 1-2 processes, for example). As a result, the activity pattern may be flagged as being potentially problematic, such that either a network security program scan may return an indication that the activities are normal and/or due to a scheduled program update and/or a user may provide feedback of the same. Once the feedback has been received the pattern analysis system may train the AI model to recognize this activity change in the future and discontinue monitoring of those activities. The old activity pattern may, at the same time or in the future, may be marked as infrequent or unusual activity going forward.

In general, the AI pattern analysis engine (e.g., a network pattern analysis engine 120 and/or a device pattern analysis engine 120') will essentially filter operations and activity that correspond to normal activity patterns from analysis. As such, any activities that are outside that normal activity are going to stand out. While some of that unusual activity may be innocuous operations (e.g., operating system activities, and the like, the activities performed by the user (sometimes within a specified timeframe such as within normal working hours) may be considered background noise. In some cases, the normal activity patterns may be analyzed on a periodic basis. In some cases, if any of the normal activity patterns may be leveraged by a nefarious actor, these activity patterns may be analyzed on a more frequent basis. For example, such activities may include creating files on a disk, creating registry keys, sending emails to individuals not normally sent emails. While such additional scanning may take time, the AI solution using pattern matching may process large amounts of data in an efficient manner. In some cases, a local AI engine (e.g., the device pattern analysis engine 120') on an endpoint may identify patterns and/or analyze activity patterns locally to a computing device. The local AI engine may additionally send the identified activity patterns with or without the pattern analysis information to a centrally (or regionally) located AI engine (e.g., the network pattern analysis engine 120) that may analyze the patterns across the entire network and additionally perform statistical analysis, and remove the normal activity patterns to identify anomalies and/or categorize the activity pattern along with sending the activity pattern, the pattern analysis information to the right computing system for analysis. In some cases, the additional analysis may occur automatically by one or more computing systems including a malware prevention computing system, an incident response and management computing system, a firewall management computing system, a data security computing system, an email communication management computing system, and the like. In some cases, the local AI pattern analysis computing systems may assign a severity rating or other categorization to abnormal activity patterns and communicate such information to the other computing systems for additional analysis. In some cases, AI analysis system may allow the activity and flag those activities for further review, such as for low-threat level activity patterns. In some cases, the centrally located analysis system may operate on one or more servers, which, like other computing devices operating on the enterprise network, may also include a local AI analysis engine performing pattern analysis on the local server device.

In some cases, the local AI analysis engine may be synchronized with centralized database so that the local AI analysis engine may train the AI model to recognize normal activity patterns found on similar machines and/or associated with other users of the network that may log into the local machine or may have similar responsibilities to a user normally using the local computing device.

In some cases, a network administrator may configure computing devices based on, at least in part, responsibilities associated with the primary user of the machine. For example, an information technology department may store approximately 4 or 5 base builds for machines based on user responsibilities, such as accounting, sales, engineering, information technology and the like. In some cases, the local AI-based scanning engine initially may be trained on historical activity pattern information found to be associated with users of a same or similar responsibility as the assigned user. After this initial setup, the local AI-based scanning engine may scan operations for a period of time (e.g., 30 days, or the like). In some cases, the local AI-based scanning engine may be continually trained within this initial timeframe. In some cases, the local AI-based scanning engine may be periodically trained within the time period or trained upon completion of this initial timeframe. As such the local AI-based scanning engine may be trained on initial patterns from across the network and similar users, not just the local machine, to better train the AI model, as well as minimizing falsely flagged activity patterns so that unusual activity patterns may be identified based on an initial pattern set, not just from local machine operations.

Activity patterns may be tied, not just to a machine, but to a user account. For example, if a user logs into different machines, the local AI-based scanning engine may be able to identify normal patterns of activity upon all machines that user logs into. For example, if a user travels to another office and uses a different computing device, its associated local AI-based scanning engine may will still be able to ignore normal activity patterns of that user during analysis. In some cases, the local activity patterns for user accounts may be synchronized across the network periodically, or upon demand (e.g., in response to a user login event). Additionally, the local AI-based scanning engine and/or the central AI-based scanning engine may be able to stop improper activities, such as a data transfer. In addition, the AI-based scanning engine may be trained to adapt its pattern analysis based on differences to the machine and/or the user accounts operating upon the machines. Further, computing devices with different operating systems may also be accounted for, due to identifying commonality between patterns activity patterns identified from performance of same or similar activities on the different computing machines such as by looking at the pattern and actioning based on what the actions identifies. Additionally, locally- and centrally-located AI scanning engines be operational on different systems having different login capabilities, such as a Lightweight Directory Access Protocol (LDAP) based system, an active directory-based system, and the like. Additionally, to allow for easier integration within multiple operating systems, application environments, and the like, an operating system agnostic application programming interface (API) may be developed to streamline integration into diverse computing environments, such that activity logs may be parsed, pulled from, and/or pushed to diverse systems and in different formats.

In some cases, the local AI-based analysis system on the endpoint level and the central node AI can independently alert on different things that because the different scanning engines may find different patterns based on analysis of different data sources. As mentioned, a scanning engine installed locally to an endpoint can prevent action or allow an action and provide an alert, depending on a severity of an identified or from a determined predicted threat of the action. As attacks evolve over time, a malicious attacker may not be focused on a single endpoint, and may instead attempt a multi-point attack, where different vectors of the attack may be performed on different machines. As such, a centrally located AI scanning engine may analyze different unknown or questionable activity patterns aggregated from the different endpoint scanning engines. For example, an attack may be initiated in a multi-point vector where a first action may initially appear to be nefarious but would be analyzed to show limited threat or innocuous activities. This attack vector may be used to obfuscate the activities that form a nefarious activity pattern may be performed at a different location on the network. By aggregating such information, the centrally located AI-based scanning engine may identify a multi-vector attack at multiple locations on the network.

In such systems, people performing actions on an endpoint may be a weak point in any network environment. By use of the AI scanning engines, both locally to each endpoint and at a central/regional location, this weakness can be overcome. For example, a willing insider, or an individual induced into helping bypass current security measures may stop or delay further analysis by manually approving an operation. However, the AI-based pattern analysis computing systems would still flag any anomalous activities, assign a threat level to any unknown activity patterns and automatically expedite review of high-level security threats, while stopping or delaying the activities until reviewed and approved via programmed analysis measures.

AI-based pattern recognition may involve one or more baselines where the analysis can be open-ended. In can be 1 of 2 baselines, open ended. In an illustrative example, baseline settings for computing devices may be based on a role of the primary user (e.g., associated with their user account) or location of use of the particular machine. For example, a local AI scanning engine installed on a computing device of an outside sales associate may have a higher likelihood of encountering environments open to intrusion (e.g., public WIFI environments, and the like) and may have a different baseline AI trained model than a computing device assigned to an accounting associate whose machine will be entirely within a trusted computing environment. The AI model for each machine may be trained from that baseline, but may also have updates applied based on updates received from a central location. In some cases, baselines may be taken and stored in a central location for new installs, 30 days of operation, 60 days of operation, 90 days of operation and user interaction activity. The baseline may include information corresponding to user interactivity and the normal activity patterns and any unexpected operations that may have occurred, whether attempted intrusions (e.g., a threat vector) or limited performance activities (e.g., an update activity triggered or operated by a system administrator account). In doing so, additional patterns may be recognized so that certain normal activity patterns (e.g., data access from commonly used network locations) may be flagged as normal activity and excluded from analysis, while a log server with a service account owner that was accessing an internet location may be flagged as improper activity (e.g., a high-level security thread since a log server should not access the internet. In doing so, automated accounts and their associated computing devices providing products and services to enterprise organization customers may also be associated with baseline activity patterns. As such, threat actors attempting to leverage service accounts with unchanging login credentials may be easily identified due to the majority of common activity being filtered and improper patterns being flagged by the AI scanning engine. Similarly, the centrally locating AI scanning device may also run with a service account whose automated operations may be monitored with a local AI scanning engine installed on the server. For example, this local AI scanning engine may quickly identify improper data requests to computing devices outside a normal region (e.g., data access to machines in an eastern region of north America by a server monitoring a western region) since the normal data gathering activity patterns will be filtered from analysis. In other words, the local AI scanning engine may be trained to learn regional communication patterns and filter out that normal expected activity.

Unusual activities that may be identified when normal activity patterns are filtered from the analysis by the local and/or central AI scanning engines may include cases where an individual (e.g., a person associated with a particular user account) may attempt to bypass a control, a service account copying d data and writing to an unexpected computing or memory device, directly copying data between user devices over the network (e.g., bypassing shared network drives), use of a WIFI-based external hard drive to transfer sensitive data (e.g., data not created locally by the user), and the like.

In some cases, analytics and reporting may be performed via an alert engine (e.g., an alert module 126, an alert module 126'), or other computing device configured to disseminate information regarding unusual patters being recognized after normal activity patterns have been filtered from the analysis. In some cases, the alert and/or reporting engine may generate alerts to individuals through external or internal computing channels, such as via email, text messaging, or direct communication to customized applications installed on a user device. In some cases, a multi-level report may be generated that may provide textual information, graphical information, or a combination of textual and graphical information to summarize an identified anomalous activity. For example, a high-level description may be sent, where users with correct permissions, may drill down into the information to see additional details as they drill down to deeper levels. In some cases, a graphical report may highlight a location or multiple locations where the anomalous activity has occurred, been initiated, or both. In some cases, a threat level may be indicated in a graphical manner (e.g., color coding, icon use, and/or the like) or via textual descriptions. In some cases, the AI scanning engine(s) may compare the identified anomalous activity and provide a score relating to how different this activity is to the filtered normal activities for users associated with the involved computing device(s). In some cases, the AI scanning engine may provide a prediction score that relates to a likelihood that the anomalous activity is associated with attempted nefarious activities.

In some cases, the pattern analysis engine 120 or 120' may gather institutional computing information that is customized for the particular enterprise. For example, the network environment scanning engine may identify application information such as standardized build image data including path values, host naming conventions, domain names, and the like, along with data logs, and other activity records. Such information may be stored in the data store 124 and utilized by the pattern analysis module 122 utilizing one or more AI or Big Data analysis techniques to learn from past activity patterns and make system improvements for identifying data fields to acquire, store, search, and analyze, or to make other process or system improvements. Various machine learning and/or Big Data analysis algorithms may be used without departing from the scope of this disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning and/or Big Data learning algorithms may be used without departing from the invention. In some examples, the pattern analysis module 122 may analyze normal operations to identify common activity patterns performed by the user, by users in similar roles to that user, by other user accounts that may have access to the particular computing device, so that normal activity patterns may be removed or filtered from the activities being analyzed by the pattern analysis engine 120, 120'. For example, the pattern analysis module 122, 122' may analyze log files or other sources of user activity information to identify normal operational patterns, remove these patterns form normal analysis and analyze remaining operations to identify anomalous activities. In some cases, the pattern analysis module 122, 122' may analyze environment variable change requests for unexpected changes such as into a different format, or at unexpected times, and/or by an unexpected application.

In some cases, threat actors may attempt to utilize known vulnerabilities in an operating system and/or application running on computing devices 130 of the enterprise computing environment 102. For example, the pattern analysis module 122 may analyze operations and/or actions performed by multiple computing devices on the enterprise network to identify patterns of activity performed by users across the network and the pattern analysis module 122' may analyze operations and/or actions performed on a local computing device to identify patterns of activity performed by users of the local device. Both the pattern analysis module 122 and the pattern analysis module 122' operate using an AI model that is trained to identify activity patterns that comprise common activities performed by the users and reflect normal day-to-day activities. These activities may then be filtered or otherwise removed from monitoring activities of the device so that the pattern analysis module 122' may continue to analyze remaining operations to efficiently identify abnormal activities being performed on the local device. The pattern analysis module 122' may communicate activity patterns, both common activity patterns and abnormal activity patterns, to the network pattern analysis engine 120 for further analysis. In some cases, the pattern analysis module 122' may continually train the AI model based on the activities performed and/or feedback received from the network pattern analysis engine 120, such as with confirmation of abnormal activity patterns, common activity patterns associated with user accounts of individuals in similar roles to other users of the computing device (e.g., computing device 132), common activity patterns associated with network administrator accounts, and the like. In some cases, the AI model and/or other information may be stored in the data stores 124' and 124 along with a knowledge that may be used by the pattern analysis module 122 and 122' to continually adapt and learn activity patterns for each local machine in the enterprise network and across all computing devices across the enterprise network. Because developers continually update and adapt supported software and/or operating systems, such knowledge bases are continually updated with common activity patterns being performed and/or newly identified activity patterns associated with vulnerabilities being identified. As such, dynamic adaptation by the pattern analysis module to changing conditions of the enterprise computing environment allows for better identification of common activity patterns representative of normal computing activities to ensure efficient identification of an unusual or improper activity pattern representative of attempts to leverage vulnerabilities by threat actors.

In some cases, the network pattern analysis engine 120 may be a tool to combat malicious attempts to gain unauthorized access to the enterprise computing environment 102 by analyzing activity patterns associated with multiple computing devices across the enterprise computing environment. In some cases, the pattern analysis engines 120 monitor and analyze activities for the entire enterprise computing environment 102. In some cases, the enterprise computing environment 102 may include multiple network pattern analysis engines, where each network pattern analysis engine 120 may monitor activities associated with each a particular region of the enterprise computing environment 102. For example, the network pattern analysis engine 120 may receive information corresponding to common activity patterns from each computing device (e.g., computing device 132, computing device 136, computing device 142, network management computing system 150, and the like. The common activity patterns may be associated with one or more user accounts, including service accounts, bot accounts, and the like, that may have different levels of rights to perform actions within the enterprise computing environment 102. The pattern analysis module 122 may include an AI engine processing an AI model that may be trained (continually trained, periodically trained) based on the common activity patterns to allow the network pattern analysis engine to remove or otherwise filter the common activity patterns from analysis to efficiently identify abnormal or unusual activity patterns indicative of potential malicious attempts to gain access to the enterprise network. Activity patterns aggregated from computing devices across the network, including from the network pattern analysis server 120 may be stored in the data store 124, along with the AI model. The network pattern analysis engine 120, once the baseline commonly used activity patterns are filtered from monitoring operations, the pattern analysis module 122 may identify unusual or unexpected activity patterns that may indicate an attempt to breach into the network and may continually learn and adapt based on each successive analysis. The pattern analysis engine 120 may be able to identify a targeted attack, such as those focused on a specific computing device either from an outside threat actor and/or an inside attacker, by analyzing unusual or unexpected activities that may indicate that an advanced threat actor that is trying, for example, to identify network identification information to bypass security measures, leverage known operating system vulnerabilities, and/or to identify when applications or scripts attempt to invoke functionality subject to the vulnerabilities. In some cases, the network pattern analysis engine 120 may update a knowledge base in response to a software upgrade performed within the enterprise computing network (e.g., based on release notes for each OS/Application approved to run on the network). For example, an installation of a new version of an operating system, may trigger the network pattern analysis engine 120 to update the knowledge base based on common activity patterns associated with network administrator or service accounts that install the new version of the operating system. In some cases, the network pattern analysis engine 120 may be used to augment antivirus and/or malware protections already in place, such as those in the network management computing system 150. In some cases, the alert module 126 and 126' may be used to communicate an indication of unusual activity patterns identified within the network. In some cases, the alert module 126 and 126' may escalate a response by forwarding and initiating action by the network management computing system for activity patterns identified to have high probability of being a malicious threat to the enterprise computing environment 102.

Figure 2:
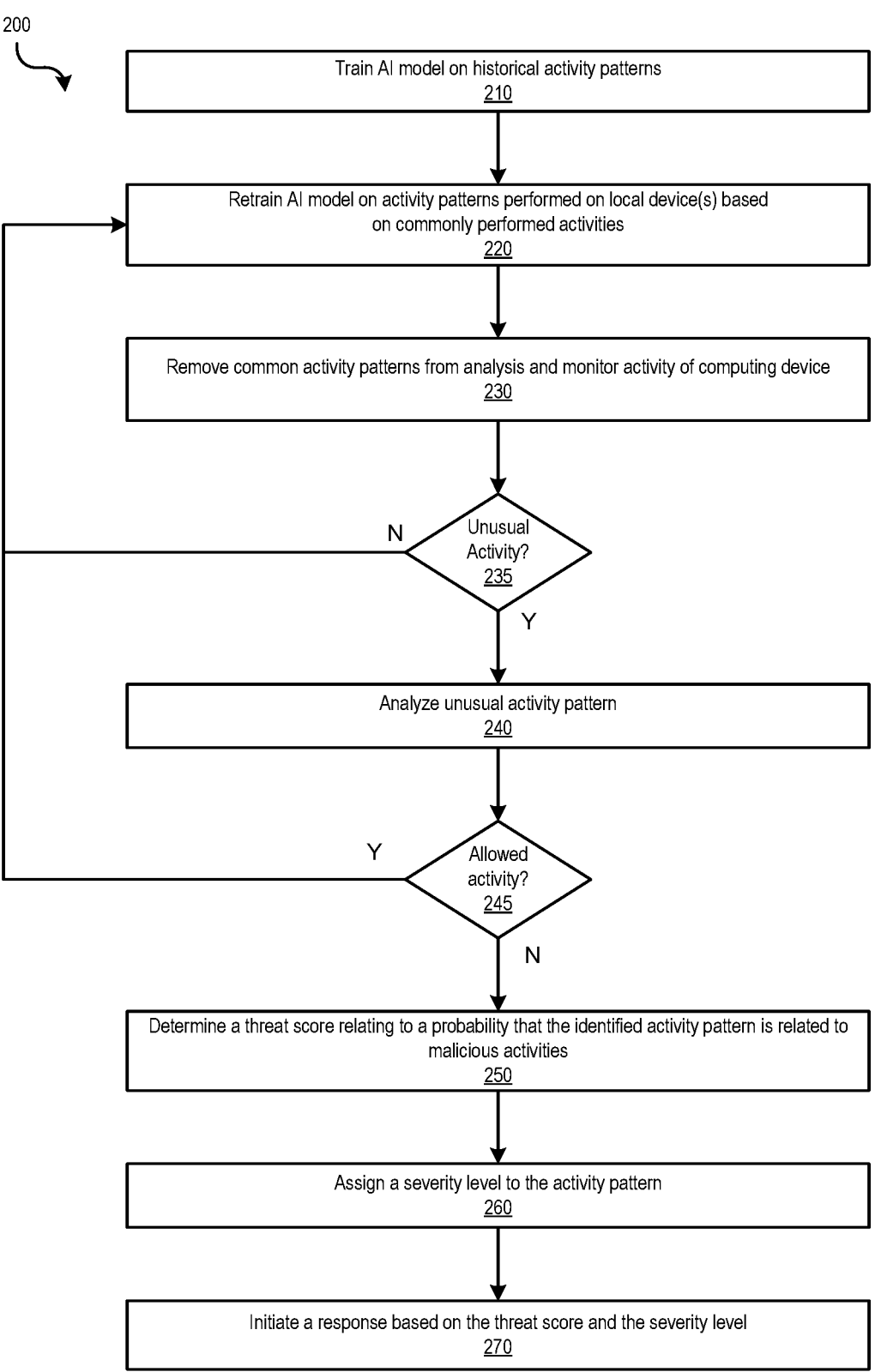
FIG. 2 shows an illustrative method to secure a computing environment by identifying and filtering normal computing activity patterns within the computing environment in accordance with one or more aspects described herein.

FIG. 2 shows an illustrative method to secure a computing environment by identifying common activity patterns on local devices and across an enterprise network, filtering the common activity from analysis functions, and acting on uncommon or unusual activity patters in accordance with one or more aspects described herein. At 210, a pattern analysis engine 120 or 120' may train an artificial intelligence model based on historical activity patterns. For example, the pattern analysis engine 120' activated on a build of a user computing device may be trained using historical activity pattern data that is associated with a user account to be allowed access to an associated computing device, a user account associated with network administration functionalities, a user account associated with one or more roles or responsibilities (e.g., sales, marketing, engineering, and the like), and other commonly identified activity patterns. Such activity pattern information may be used to activate an initial baseline of common activity patterns that may be excluded from active monitoring activities on the computing device. Similarly, a network pattern analysis module may be trained similarly, with the historical information including identified common activity patterns for each user account active within a network neighborhood (e.g., an entire computing network, a regional portion of a computing network, and the like) to train the AI model to set a baseline for network activity patterns common across the network to create a baseline of common activity patterns that may be excluded from active monitoring of activities within the network neighborhood. At 220, during operation the AI model(s) may be retrained (e.g., continuously, periodically such as 30 days, 60 days, and 90 days, and the like) to ensure that common activity patterns are recognized and included with the filtered baseline activities to ensure efficient identification of unusual and/or unexpected activity patterns.

At 230, the network pattern analysis engine 120 and/or the device pattern analysis engine 120' may update an activity filter within the pattern analysis module 122, 122' based on updated common activity patterns where newly identified common activity patterns may be added to the baseline activity that is excluded from analysis and formerly common activity patterns that are found to be no longer performed by user accounts on the network or the local device may be removed form the baseline activity patterns and monitoring and analysis of computing activities continues.

At 235, the pattern analysis module 122 or 122' may identify an activity pattern that being performed by a user account of the local device or by a user account within the network. Here, the pattern analysis engine 120 or 120', may perform additional analysis to identify whether the activity pattern is unusual, thus requiring additional or may be a benign activity pattern that may reflect a change in how a user or software operates on a particular computing device. If, at 235, the activity pattern is found to reflect benign activity, the AI model may be retrained at 220 to reflect this information and, if the new activity pattern is found to be a common activity pattern (e.g., occurs frequently over a period of time such as 30 days, 60 days and the like) the new common activity pattern may be added to the baseline and communicated to a central location. If, at 235, the activity pattern is found to be unusual or unexpected behavior that is of questionable nature, the pattern analysis module 122, 122' may perform additional analysis of the activity pattern at 240. Here, the network pattern analysis engine 120 and/or the device pattern analysis engine 120' may analyze the identified unusual activity pattern to determine, at 245, whether certain activities within, or the pattern as a whole, correspond to potentially malicious activities or allowed activities for which then the network pattern analysis engine 120 and/or the device pattern analysis engine 120' may add allowed activities into the knowledge base for possible inclusion as normal activities at 220 or initiate determination of a threat score relating to a probability that the identified activity pattern is related to malicious activity at 250. For instance, the network pattern analysis engine 120 and/or the device pattern analysis engine 120' may analyze and compare activity patterns of known or suspected improper activities to the identified problematic activity pattern and assign a numerical score related to a similarity between known malicious activity patterns and the identified activity pattern. For example, the activity pattern is analyzed to determine a pattern of activity being performed (e.g., transferring files between user computing devices, service accounts accessing unusual data locations or communicating outside the enterprise network, and the like). At 260, a severity level is assigned by the network pattern analysis engine 120 and/or the device pattern analysis engine 120' to the identified activity pattern and, at 270, a response and/or alert is initiated based on the threat score and the severity level as discussed above.

Figure 3:
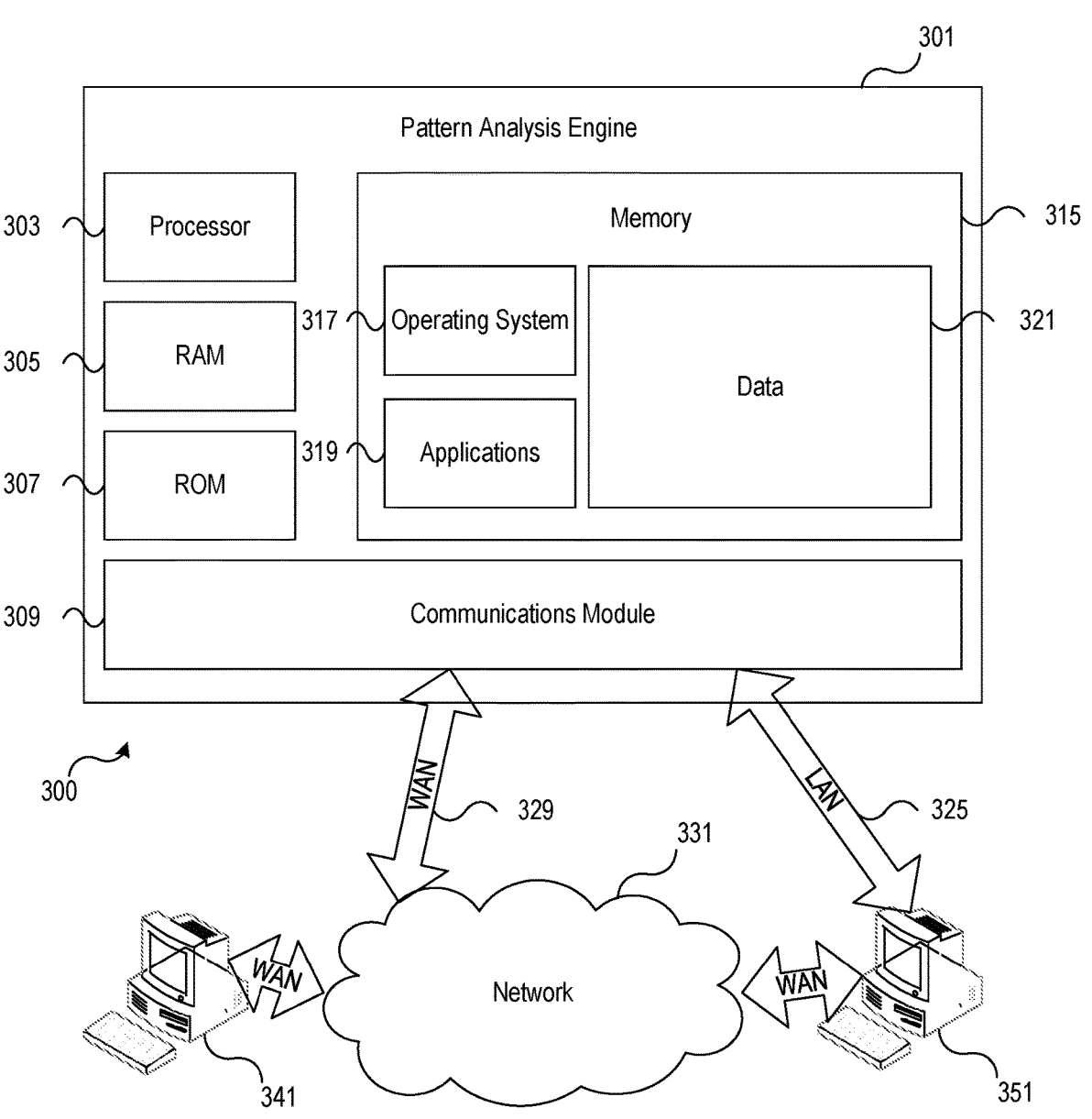
FIG. 3 shows an illustrative computing environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3 a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative pattern analysis engine 301 having a processor 303 for controlling overall operation of the pattern analysis engine 301 and its associated components, including a Random-Access Memory (RAM) 305, a Read-Only Memory (ROM) 307, a communications module 309, and a memory 315. The pattern analysis engine 301 may include a variety of computer readable media. Computer readable media may be any available media that may be accessed by the pattern analysis engine 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the pattern analysis engine 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the pattern analysis engine 301. Such a processor may execute computer-executable instructions stored on a computer-readable medium.

Software may be stored within the memory 315 and/or other digital storage to provide instructions to the processor 303 for enabling the pattern analysis engine 301 to perform various functions as discussed herein. For example, the memory 315 may store software used by the pattern analysis engine 301, such as an operating system 317, one or more application programs 319, and/or an associated database 321. In addition, some, or all of the computer executable instructions for the pattern analysis engine 301 may be embodied in hardware or firmware. Although not shown, the RAM 305 may include one or more applications representing the application data stored in the RAM 305 while the pattern analysis engine 301 is on and corresponding software applications (e.g., software tasks) are running on the pattern analysis engine 301.

The communications module 309 may include a microphone, a keypad, a touch screen, and/or a stylus through which a user of the pattern analysis engine 301 may provide input, and may include one or more of a speaker for providing audio output and a video display device for providing textual, audiovisual, and/or graphical output. The computing system environment 300 may also include optical scanners (not shown).

The pattern analysis engine 301 may operate in a networked environment supporting connections to one or more remote computing devices, such as the computing devices 341 and 351. The computing devices 341 and 351 may be personal computing devices or servers that include any or all of the elements described above relative to the pattern analysis engine 301.

The network connections depicted in FIG. 3 may include a Local Area Network (LAN) 325 and/or a Wide Area Network (WAN) 329, as well as other networks. When used in a LAN networking environment, the pattern analysis engine 301 may be connected to the LAN 325 through a network interface or adapter in the communications module 309. When used in a WAN networking environment, the pattern analysis engine 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/ Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
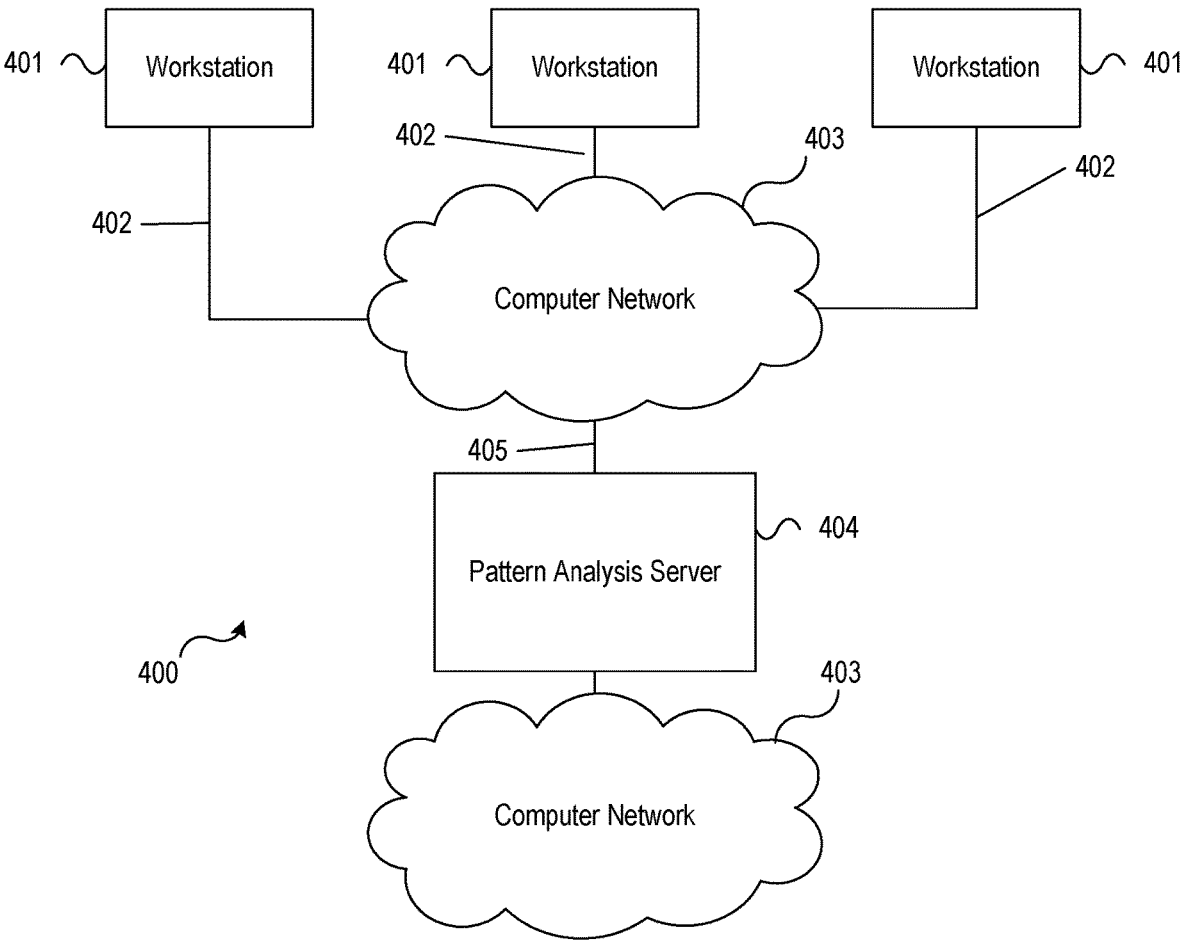
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to pattern analysis server 404. In the system 400, the pattern analysis server 404 may be a server, processor, computer, or data processing device, or combination of the same, configured to perform the functions and/or processes described herein. The pattern analysis server 404 may be used to secure a networked computing environment.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the pattern analysis server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method comprising:

training an artificial intelligence (AI) model based on historical activity patterns associated with a plurality of user accounts comprising individual user accounts, administrator accounts, and autonomous bot accounts;

monitoring computing operations and activities of a plurality of local computing devices via an AI-based analysis engine and using the trained AI model deployed within each of the plurality of local computing devices;

aggregating, by a central pattern analysis server comprising a centrally located AI-based analysis engine, pattern analysis information sent by each of the plurality of local computing devices across enterprise network;

identifying, by the centrally located AI-based analysis engine, baseline activities comprising one or more common activity patterns, wherein each common activity pattern of the one or more common activity patterns are unique to each corresponding user account of the plurality of user accounts;

identifying, by the centrally located AI-based analysis engine, a formerly common activity pattern of the one or more common activity patterns that is no longer being performed;

removing, by the centrally located AI-based analysis engine via training of the AI model, the formerly common activity pattern of the one or more common activity patterns from the baseline activities;

excluding, by the centrally located AI-based analysis engine and by the AI model, operations and activities corresponding to the common activity patterns during monitoring of real-time operations and activities;

identifying, by the centrally located AI-based analysis engine, an unusual activity pattern;

determining, by the centrally located AI-based analysis engine, a threat score and a severity level is assigned by the network pattern analysis engine associated with the unusual activity patterns related to a similarity between known malicious activity patterns and the identified activity pattern;

retraining, based on the excluded common activity patterns reflecting a benign activity pattern corresponding to allowed user activities and including flagged unusual activity patterns, the AI model with the flagged unusual activity patterns over a specified timeframe; and initiating, automatically and based on the threat score and the severity level, an incident response meeting a condition associated with an attempted network security event.

2. The method of claim 1, wherein the activity patterns correspond to computing operations performed during tasks performed by a user associated with at least one user account of the plurality of user accounts.

3. The method of claim 1, wherein at least one user account of the plurality of user accounts is associated with a service account having unchanging login credentials and the common activity patterns correspond to automated operations performed by the service account on a dedicated server.

4. The method of claim 1, wherein the historical activity patterns are associated with a plurality of user accounts sharing a common workflow, where the activity patterns differ based on underlying computing hardware and/or software components.

5. The method of claim 1, wherein training an artificial intelligence (AI) model based on historical activity patterns associated with a user account occurs after configuration of a new build of a computing device to be associated with user by a primary user account.

6. The method of claim 1, wherein the common activity patterns comprise a plurality of computing operations performed by software operating on the computing device in performance of computing tasks in response to user requests.

7. The method of claim 1, wherein the common activity patterns form a baseline of operations and activities normally performed on the local computing device associated with a user account of the plurality of user accounts, wherein the common activity patterns are filtered from analysis operations.

8. The method of claim 1, further comprising triggering a warning response by an external computing system based on the threat score meeting a first threshold condition; and triggering an incident response by the local computing device and the external computing system based on the threat score meeting a second threshold condition.

9. The method of claim 8, wherein the incident response comprises:

disabling operations at a local machine; and quarantining, by the external computing system, the local computing device.

10. An apparatus comprising: a processor; and non-transitory memory storing instructions that, when executed by the processor, cause a computing device to:

train an artificial intelligence (AI) model based on historical activity patterns associated with a plurality of user accounts comprising individual user accounts, administrator accounts, and autonomous bot accounts;

monitor computing operations and activities of a plurality of local computing device via an AI-based analysis engine and using the trained AI model deployed within each of the plurality of local computing devices;

aggregate, by a central pattern analysis server comprising a centrally located AI-based analysis engine, pattern analysis information sent by each of the plurality of local computing devices across enterprise network;

identify, by the centrally located AI-based analysis engine, baseline activities comprising one or more common activity patterns, wherein each common activity pattern of the one or more common activity patterns are unique to each corresponding user account of the plurality of user accounts;

identify, by the centrally located AI-based analysis engine, a formerly common activity pattern of the one or more common activity patterns that is no longer being performed;

remove, by the centrally located AI-based analysis engine, the formerly common activity pattern of the one or more common activity patterns from the baseline activities;

exclude, by the centrally located AI-based analysis engine, the common activity patterns during monitoring of operations and activities;

identify, by the centrally located AI-based analysis engine, an unusual activity pattern;

determine, by the centrally located AI-based analysis engine, a threat score and a severity level is assigned by the network pattern analysis engine associated with the unusual activity patterns related to a similarity between known malicious activity patterns and the identified activity pattern;

retrain, based on the excluded common activity patterns reflecting a benign activity pattern corresponding to allowed user activities and including flagged unusual activity patterns, the AI model with the flagged unusual activity patterns over a specified timeframe; and initiate, automatically and based on the threat score and the severity level, an incident response meeting a condition associated with an attempted network security event.

11. The apparatus of claim 10, wherein the activity patterns correspond to computing operations performed during tasks performed by a user associated with at least one user account of the plurality of user accounts.

12. The apparatus of claim 10, wherein the user account is associated with a service account and the activity patterns correspond to automated operations performed by the service account on a dedicated server.

13. The apparatus of claim 10, wherein the historical activity patterns are associated with a plurality of user accounts sharing a common workflow, where the activity patterns differ based on underlying computing hardware and/or software components.

14. The apparatus of claim 10, wherein training an artificial intelligence (AI) model based on historical activity patterns associated with a user account occurs after configuration of a new build of a computing device to be associated with user by a primary user account.

15. The apparatus of claim 10, wherein the common activity patterns comprise a plurality of computing operations performed by software operating on the computing device in performance of computing tasks in response to user requests.

16. The apparatus of claim 10, wherein the common activity patterns form a baseline of operations and activities normally performed on the local computing device associated with a user account of the plurality of user accounts, wherein the common activity patterns are filtered from analysis operations.

17. The apparatus of claim 10, wherein the instructions further cause the computing device to trigger a warning response by an external computing system based on the threat score meeting a first threshold condition; and trigger an incident response by the local computing device and the external computing system based on the threat score meeting a second threshold condition.

18. The apparatus of claim 17, wherein the instructions cause the computing device to:

disable operations at the computing device as part of the incident response; and quarantine, by the external computing system as part of the incident response, the local computing device.

19. Non-transitory computer readable media storing instructions that, when executed by a processor, cause a computing device to:

train an artificial intelligence (AI) model based on historical activity patterns associated with a plurality of user accounts comprising individual user accounts, administrator accounts, and autonomous bot accounts;

monitor computing operations and activities of a plurality of local computing device via an AI-based analysis engine and using the trained AI model deployed within each of the plurality of local computing devices;

aggregate, by a central pattern analysis server comprising a centrally located AI-based analysis engine, pattern analysis information sent by each of the plurality of local computing devices across enterprise network;

identify, by the centrally located AI-based analysis engine, baseline activities comprising one or more common activity patterns, wherein each common activity pattern of the one or more common activity patterns are unique to each corresponding user account of the plurality of user accounts;

identify, by the centrally located AI-based analysis engine, a formerly common activity pattern of the one or more common activity patterns that is no longer being performed;

remove, by the centrally located AI-based analysis engine, the formerly common activity pattern of the one or more common activity patterns from the baseline activities;

exclude, by the centrally located AI-based analysis engine, the common activity patterns during monitoring of operations and activities;

identify, by the centrally located AI-based analysis engine, an unusual activity pattern;

determine, by the centrally located AI-based analysis engine, a threat score and a severity level is assigned by the network pattern analysis engine associated with the unusual activity patterns related to a similarity between known malicious activity patterns and the identified activity pattern;

retrain, based on the excluded common activity patterns reflecting a benign activity pattern corresponding to allowed user activities and including flagged unusual activity patterns, the AI model with the flagged unusual activity patterns over a specified timeframe; and initiate, automatically and based on the threat score and the severity level, an incident response meeting a condition associated with an attempted network security event.

20. The non-transitory computer readable media of claim 19, wherein the instructions further cause the computing device to:

disable operations at an identified local machine as part of the incident response; and quarantine, by an external computing system as part of the incident response, the local computing device.

\* \* \* \* \*